United States Patent [19]
Yoshie et al.

[11] Patent Number: 5,624,152
[45] Date of Patent: Apr. 29, 1997

[54] SUN-SHADING HOOD HEIGHT ADJUSTING DEVICE FOR STROLLER

[75] Inventors: Toshiro Yoshie; Tsutomu Nagai; Hiroaki Matsuda; Hitoshi Nakamura, all of Tokyo, Japan

[73] Assignee: Combi Corporation, Tokyo, Japan

[21] Appl. No.: 304,695

[22] Filed: Sep. 12, 1994

[30] Foreign Application Priority Data

Sep. 30, 1993 [JP] Japan .................. 5-057339 U

[51] Int. Cl.⁶ .................................................. A47C 7/62
[52] U.S. Cl. .................. 297/184.13; 297/184.11; 297/184.15; 280/642
[58] Field of Search ................ 297/184.11, 184.13, 297/184.17, 184.1, 184.15; 280/642, 647, 652

[56] References Cited

U.S. PATENT DOCUMENTS

| | | | |
|---|---|---|---|
| 270,224 | 1/1883 | Johnson et al. | 297/184.17 X |
| 2,545,968 | 3/1951 | Newstead | 297/184.11 X |
| 2,837,140 | 6/1958 | Hedman | 297/184.11 X |
| 3,561,787 | 2/1971 | Toda | 280/642 |
| 4,542,915 | 9/1985 | Wheeler | 280/642 |
| 5,168,889 | 12/1992 | Diestel | 297/184.15 X |

*Primary Examiner*—Laurie K. Cranmer
*Attorney, Agent, or Firm*—Sughrue, Mion, Zinn, Macpeak & Seas

[57] ABSTRACT

A sun-shading hood height adjusting device for a stroller includes holders for a sun-shading hood that can slide up and down along both sides of a seat, vertically sliding portions for allowing the holders to slide are formed on both sides of the seat, and retaining recessed grooves are formed on a part of the holders and are selectively engaged with and retained in a part of the seat.

2 Claims, 3 Drawing Sheets

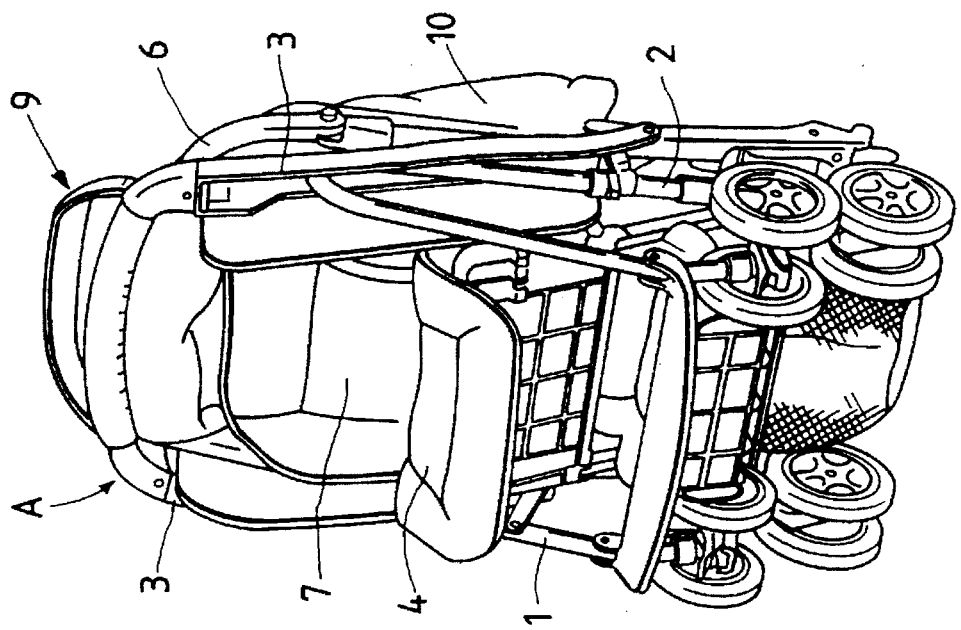
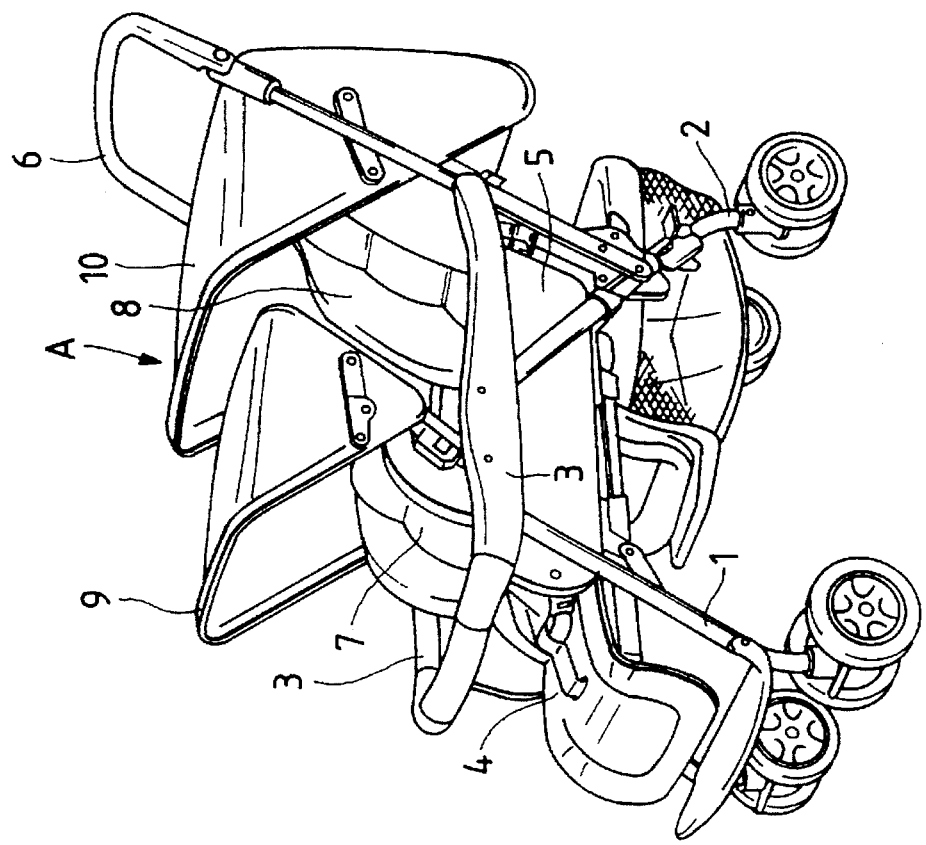

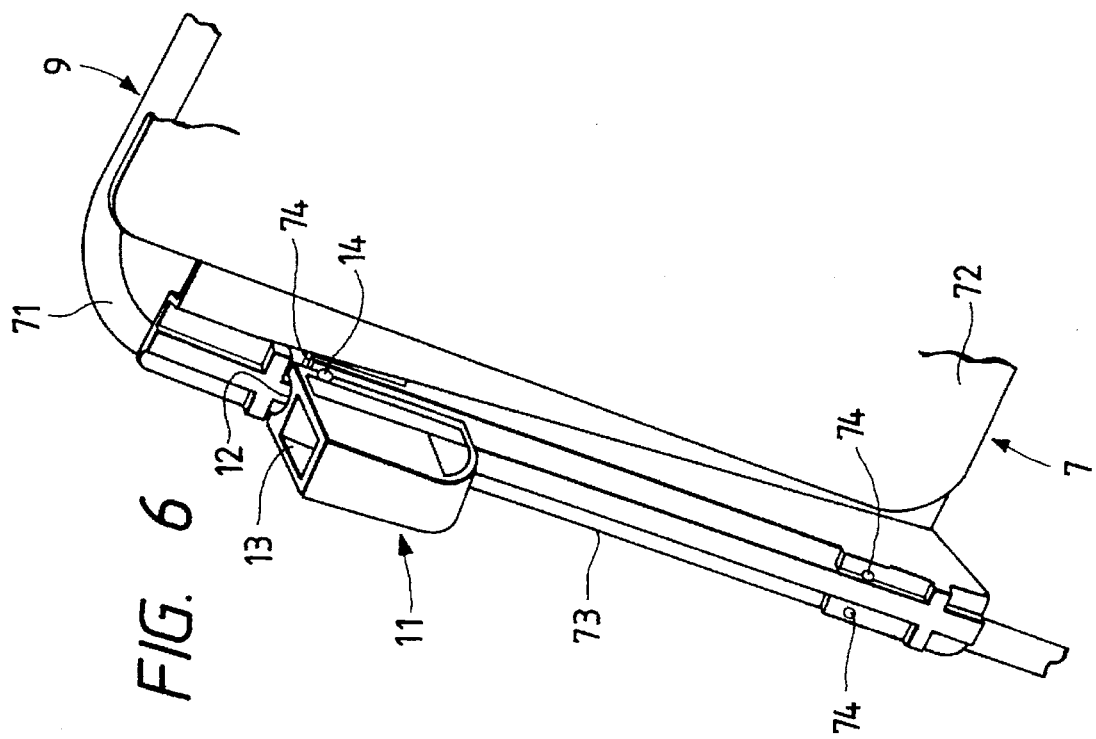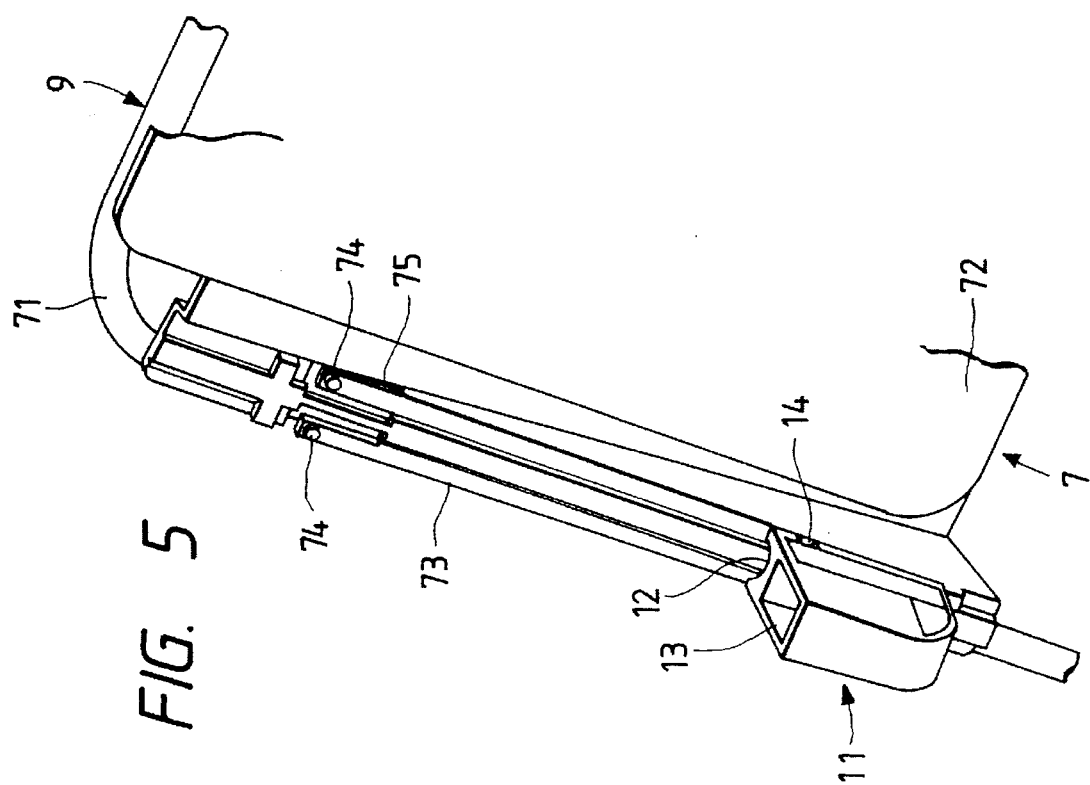

5,624,152

SUN-SHADING HOOD HEIGHT ADJUSTING DEVICE FOR STROLLER

FIELD OF THE INVENTION

The present invention generally relates to a hood height adjusting device for a baby stroller and, more particularly, to a hood height adjusting device for a double baby stroller (i.e., a stroller having two seats).

BACKGROUND OF THE INVENTION

A hood for providing shade on a baby stroller containing a single seat is generally designed so as to be foldable. Specifically, both ends of the folding hood body are releasably attached to respective attaching portions formed at appropriate positions on both sides of a rear portion of the single seat. In order to fold the stroller, it is not necessary to perform any preparatory operation such as folding only the sun-shading hood in advance. Therefore, the folding of the stroller body itself allows the sun-shading hood to be compactly folded at the same time.

However, in the case of a so-called double stroller (i.e., a stroller having two seats), and particularly in the case of a tandem-seated double stroller such as exemplified in FIG. 1, a problem is encountered. Specifically, if the stroller body is folded as exemplified in FIGS. 2 and 3, the top end portion of the hood which is attached to the rear seat is lower than the top end portion of a handle pole, thereby imposing no problem when carrying the folded stroller. However, the top end portion of the hood which is attached to the front seat is higher than the top end portion of the handle pole, thereby posing a problem to the person carrying the folded stroller. Specifically, the extended hood acts as an obstacle to the person trying to grasp the handle pole. This problem occurs because a seat attaching portion of the front seat is located in a front half of the stroller body.

SUMMARY OF THE INVENTION

Accordingly, an object of the present invention is to overcome the above problem. The present invention overcomes this problem by providing a hood height adjusting device for a stroller which is capable of causing a front seat hood (which projects above a handle pole when the stroller main body is folded) to be lowered. Specifically, the hood is lowered along the front seat in a simple manner so that the hood can be moved to a level that is lower than that of the top end portion of the handle pole, thereby obviating the above-described problem.

Another object of the present invention is to provide a hood height adjusting device for a stroller which is capable of not only self-elevating the lowered sun-shading hood, but also of allowing the elevated sun-shading hood to be correctly stopped at a predetermined position.

According to an embodiment of the invention, a hood height adjusting device for a stroller is provided wherein hood holders are attached to respective sides of a baby seat in such a manner so as to be movable both up and down. The hood holders allow both end portions of a hood to be releasably inserted therethrough; and retaining projections (or retaining recessed grooves) formed on a part of each of the hood holders are engaged with and retained in retaining recessed grooves (or retaining projections) formed on a seat plate positioned on the back of the hood holder.

BRIEF DESCRIPTION OF THE DRAWINGS

FIG. 1 is a perspective view of a stroller with sun-shading hoods attached thereto;

FIG. 2 is a perspective view of the stroller of FIG. 1 in a folded state;

FIG. 5 is an enlarged perspective view of the main portion of a hood holder according to an embodiment of the invention which is disposed at a lower position of a frame pole; and FIG. 6 is an enlarged perspective view of a main portion of the hood holder which is disposed at an upper portion of the frame pole.

DESCRIPTION OF THE PREFERRED EMBODIMENT

An embodiment of the invention will be described with reference to the drawings.

Figure 3:
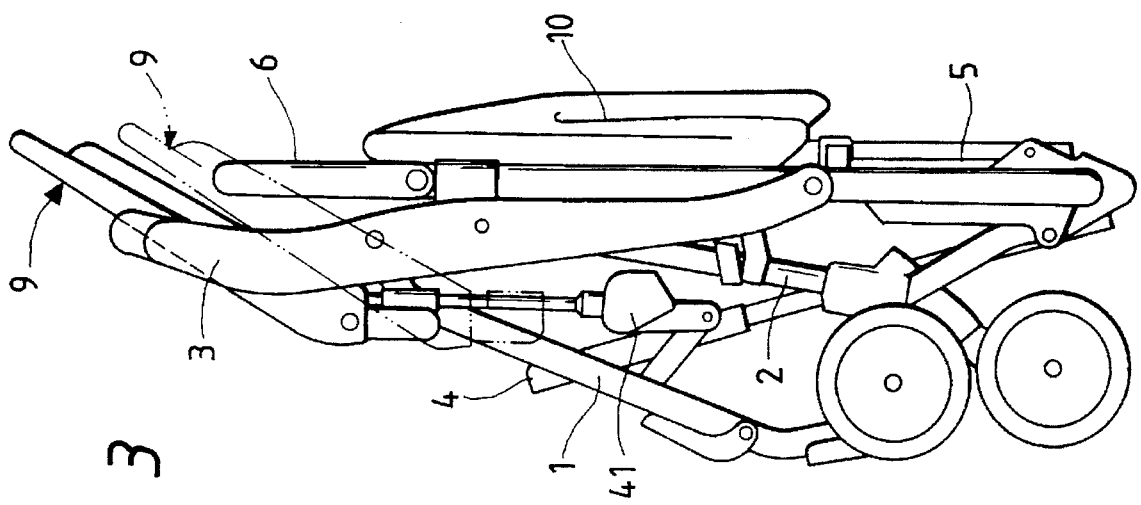
FIG. 3 is a side view showing how the sun-shading hood (which is higher than the handle pole in FIG. 2) is moved.

Referring to FIGS. 1–3, a stroller generally designated by reference character A is known as a folding stroller having two seats and includes: a pair of front leg poles 1, 1; a pair of rear leg poles 2, 2; and a pair of armrest poles 3, 3, the poles of each pair confronting each other and being linked together in the width direction. A front seat 4 and a rear seat 5 are respectively arranged inside a space provided by the pairs of the front leg poles 1, 1, the rear leg poles 2, 2, and the armrest poles 3, 3. A handle pole 6 extends upward from the intermediate portions of the rear leg poles 2, 2.

A pair of backrests 7 and 8 are reclinably arranged at a rear end portion of the front seat 4 and at the rear end portion of the rear seat 5, respectively. Sun-shading hoods 9 and 10 are arranged at upper end portions of the two backrests 7 and 8 such that the sun-shading hoods can be folded.

The structure of each of the sun-shading hoods 9 and 10 is known in the art. In general, both ends of several U-shaped hood bones or pieces (not shown) are respectively grouped together so as to be fan-like and expandable, and a sun-shading hood cloth C is attached to the several expanded hood pieces.

The structure for attaching the sun-shading hood 10 to the backrest 8 of the rear seat 5 is known in the art and therefore a detailed description of this structure is not provided. In general, however, the structure releasably engages both end portions of the sun-shading hood 10 with attaching portions (not shown) formed at upper end portions of the armrest poles 3, 3.

Figure 4:
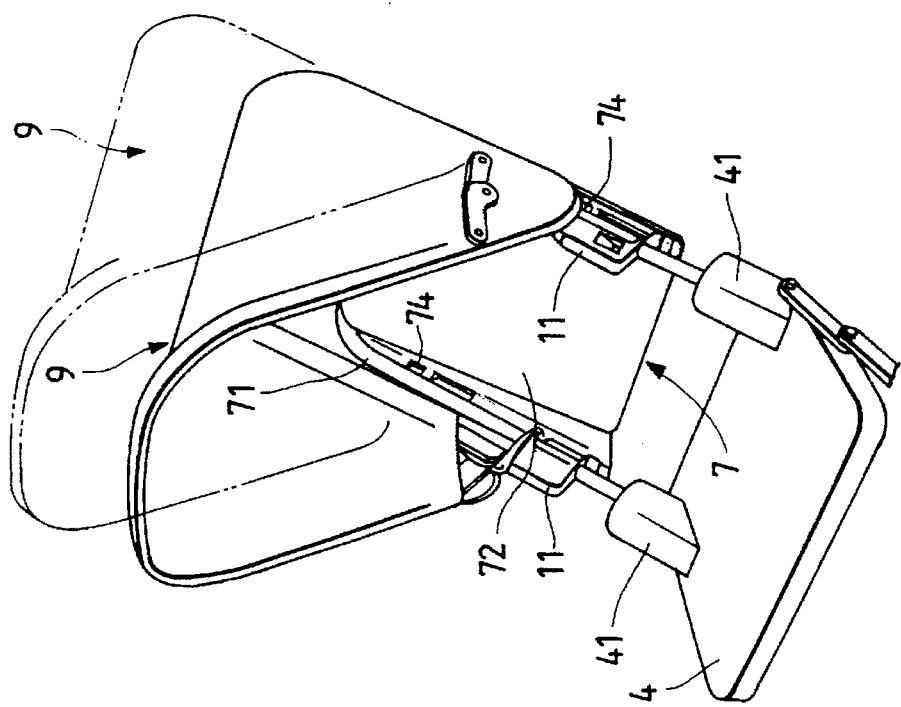
FIG. 4 is a perspective view of a front seat of a double stroller.

The backrest portion 7 of the front seat 4 is formed by bending a frame pole 71 (FIG. 4) having a circular section in U shape. Both end portions of the U-shaped frame pole 71 are rotatably attached to support portions 41, 41 so as to be erectable, the support portions being formed on both sides of a rear portion of the front seat 4.

A backrest plate 72 is attached to the entire part of the inner surface enclosed by the U-shaped frame pole 71.

Reference numeral 11, 11 designates a holder of a sun-shading hood 9 which is attached to the front seat 4. The two holders 11, 11 are attached to both erected portions of the U-shaped frame pole 71 so as to be movable in a vertical direction. Both end portions of the sun-shading hood 9 can be releasably attached to the holders 11.

Each holder 11 of the sun-shading hood 9 is designed to be attached to the U-shaped frame pole 71 formed on the front seat 4. As shown in FIG. 5, the holder 11 includes a frame pole engaging portion 12 having a circular through-hole for allowing the frame pole 71 to be slidably inserted therethrough, and a sun-shading hood engaging portion 13 for releasably engaging a hood bone base portion of the hood 9. Retaining recessed grooves 14 engageable with retaining projections 74, 74 are integrally formed on the back of the frame pole engaging portion 12. The retaining recessed grooves 14 are notched close to both upper and lower ends of each of slender plate-like stoppers 73 attached to both lateral sides of the backrest plate 72.

It should be noted that while an embodiment has been described in which the U-shaped frame pole 71 serving as a front seat enclosing frame is formed of a pole body whose section is circular and in which the backrest plate 72 is connected to the space provided by the frame pole 71, the present invention is not limited thereto. For example, the entire part of the front seat 4 may be formed of a plate-like body such as a hard synthetic resin plate and the holders 11 of the hood 9 may be slidably attached to both lateral portions of the plate-like body.

As exemplified in FIG. 5, it is desirable that vertically long groove-like notches 75, 75 be formed on both side portions of each retaining projection 74 formed on each plate-like stopper 73. This arrangement allows the end portion having the retaining projection 74 formed thereon to be given an upward floating force by resiliency, so that a further rigid engagement of the retaining projections 74 with the corresponding retaining recessed grooves 14 of the holder 11 can be maintained.

In the example of FIG. 5, retaining recessed grooves 14 are formed on the back of the holder 11 for the hood 9 and the retaining projections 74, 74 engageable therewith are formed on the plate-like stopper 73. However, in an alternative embodiment, the retaining projections may be formed on the back of the holder 11 and engaging recessed grooves or engaging notches may be formed on the side of the stopper 73.

In a still further embodiment, instead of forming the slender plate-like stopper 73 as a single part, both sides of the backrest plate 72 may be utilized as the stopper.

As described above, the device according to an embodiment of the invention is designed to attach the holders 11 of the hood 9 so as to be vertically slidable along both sides of the front seat 4. Therefore, in the case where the top end portion of the hood 9 extends beyond the top end portion of the handle pole 6 (e.g., when the stroller main body is folded as shown in, for example, FIGS. 2 and 3), the hood 9 can be forcibly pushed down, so that the holders 11, 11 attached to the hood 9 are smoothly lowered along the frame poles 71, 71 down to a point where the holders 11, 11 are positioned to a level lower than the top end portion of the handle pole 6. For example, the position represented by the two-dot chain line in FIG. 3.

Moreover, the device according to an embodiment of the invention is designed to form retaining recessed grooves 14, 14 on the back of the holder 11 of the hood 9 so that the retaining recessed grooves 14, 14 can be engaged with retaining projections 74, 74 formed on the stopper 73 attached to the back of the frame pole 71. Therefore, when the sun-shading hood 9 is moved to a desired position, the retaining projections 74 formed at the upper position of the stopper 73 are engaged with the retaining recessed grooves 14 so that the hood 9 does not irregularly slide downward or upward. As a result, the sun-shading hood 9 is stably positioned.

Particularly, when the vertically long groove-like notches 75, 75 are formed on both sides of the portion of the stopper 73 on which the retaining projections 74 are formed, a strong resiliency is imparted to the distal end portion on which the retaining projections 74 are formed. As a result, the retainment between the retaining recessed grooves 14 formed on the holder 11 and the retaining projections 74 is strengthened, thereby providing a significant advantage.

What is claimed is:

1. A sun-shading hood height adjusting device for a stroller comprising:

a U-shaped frame pole;

a first hood holder disposed on a first side of said U-shaped frame pole; and a second hood holder disposed on the other side of said U-shaped frame pole;

wherein each of said first and second hood holders includes a frame pole engaging portion including a circular through-hole for allowing said U-shaped frame pole to be slidably inserted therethrough, wherein each of said first and second holders includes a first engaging unit, wherein a second engaging unit is disposed along each of said first and other sides of said U-shaped frame, wherein said first engaging unit comprises recessed grooves, wherein said second engaging unit comprises projections, and wherein the device further comprises a pair of slender plate-like portions disposed adjacent the first and other sides of said U-shaped frame, respectively, said plate-like portions including said projections.

2. In a stroller of the type comprising a foldable frame including a handle pole, a first seat disposed within said frame, a first hood for shading said first seat, a second seat disposed within said frame, a second hood, separate from the first hood, for shading said second seat, wherein when said foldable frame is folded, said second hood extends beyond said handle pole, the improvement comprising:

a height adjusting mechanism for lowering the height of said second hood so that when said foldable frame is folded, said second hood does not extend beyond said handle, thereby allowing a user to easily handle the folded frame by grasping said handle pole, wherein said foldable frame includes a U-shaped frame pole, and wherein said height adjusting mechanism comprises a first hood holder disposed on a first side of said U-shaped frame pole; and a second hood holder disposed on the other side of said U-shaped frame pole; and wherein each of said first and second hood holders includes a frame pole engaging portion including a circular through-hole for allowing said U-shaped frame pole to be slidably inserted therethrough, wherein each of said first and second holders includes a first engaging unit, and wherein a second engaging unit is disposed along each of said first and other sides of said U-shaped frame, wherein said first engaging unit comprises recessed grooves, and said second engaging unit comprises projections, and wherein the device further comprises a pair of slender plate-like portions disposed adjacent the first and other sides of said U-shaped frame, respectively, said plate-like portions including said projections.

* * * * *